(12) United States Patent
Gu et al.

(10) Patent No.: US 10,649,562 B2
(45) Date of Patent: May 12, 2020

(54) IN-CELL TOUCH SCREEN AND A DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Honggang Gu, Beijing (FR); Xiaohe Li, Beijing (FR); Xianjie Shao, Beijing (FR); Jie Song, Beijing (FR)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 292 days.

(21) Appl. No.: 15/515,569

(22) PCT Filed: Jan. 21, 2016

(86) PCT No.: PCT/CN2016/071594
§ 371 (c)(1),
(2) Date: Mar. 29, 2017

(87) PCT Pub. No.: WO2017/028496
PCT Pub. Date: Feb. 23, 2017

(65) Prior Publication Data
US 2017/0300155 A1 Oct. 19, 2017

(30) Foreign Application Priority Data

Aug. 20, 2015 (CN) .......................... 2015 1 0512961

(51) Int. Cl.
*G02F 1/1333* (2006.01)
*G02F 1/1343* (2006.01)
(Continued)

(52) U.S. Cl.
CPC ........ *G06F 3/0412* (2013.01); *G02F 1/13338* (2013.01); *G02F 1/134336* (2013.01);
(Continued)

(58) Field of Classification Search
None
See application file for complete search history.

(56) References Cited

U.S. PATENT DOCUMENTS

2011/0278078 A1* 11/2011 Schediwy ............... G01L 1/146
178/18.06
2013/0250225 A1* 9/2013 Maeda ................. G02F 1/13338
349/143
(Continued)

FOREIGN PATENT DOCUMENTS

CN 101320185 A 12/2008
CN 102890379 A 1/2013
(Continued)

OTHER PUBLICATIONS

International Search Report and Written Opinion in PCT/CN2016/071594 dated May 19, 2015, with English translation. 17 pages.
(Continued)

*Primary Examiner* — Edward J Glick
*Assistant Examiner* — Anthony G Quash
(74) *Attorney, Agent, or Firm* — Womble Bond Dickinson (US) LLP

(57) ABSTRACT

The present invention provides an In-Cell touch screen and a display device, which belongs to the field of touch display technology. The FIC capacitive touch screen comprises an array substrate and touch electrodes disposed above or below the array substrate, the touch electrodes comprising a plurality of first capacitive electrodes and a plurality of second capacitive electrodes, wherein the first capacitive electrode comprises a plurality of electrically connected
(Continued)

capacitive electrode blocks correspondingly located in areas where at least a portion of sub-pixel units of the array substrate are located. The FIC capacitive touch screen has fewer reports for false touch point.

20 Claims, 6 Drawing Sheets

(51) Int. Cl.
*G06F 3/041* (2006.01)
*G06F 3/044* (2006.01)
*H04N 5/232* (2006.01)
*G02F 1/1362* (2006.01)
*G09G 3/36* (2006.01)

(52) U.S. Cl.
CPC ........ *G02F 1/136286* (2013.01); *G06F 3/044* (2013.01); *G06F 3/0416* (2013.01); *G06F 3/0418* (2013.01); *G02F 2001/134345* (2013.01); *G06F 2203/04111* (2013.01); *G09G 3/3607* (2013.01); *G09G 3/3648* (2013.01)

(56) References Cited

U.S. PATENT DOCUMENTS

| | | | | |
|---|---|---|---|---|
| 2014/0035864 A1* | 2/2014 | Chang | ............... | G06F 3/044 345/174 |
| 2014/0125626 A1* | 5/2014 | Yang | ............... | G02F 1/134336 345/174 |
| 2014/0247402 A1* | 9/2014 | Chou | ............... | G02F 1/13338 349/12 |
| 2015/0002752 A1* | 1/2015 | Shepelev | ............... | G06F 3/044 349/12 |
| 2015/0022501 A1* | 1/2015 | Kita | ............... | G02F 1/13338 345/174 |
| 2015/0069362 A1 | 3/2015 | Ito | | |
| 2015/0153877 A1* | 6/2015 | Han | ............... | G06F 3/044 345/174 |
| 2016/0291749 A1* | 10/2016 | Zhou | ............... | G06F 3/0412 |
| 2016/0291779 A1* | 10/2016 | Lu | ............... | G06F 3/044 |
| 2016/0370914 A1 | 12/2016 | Xie | | |
| 2017/0371466 A1* | 12/2017 | Ishizaki | ............... | G02F 1/13338 |
| 2018/0013086 A1* | 1/2018 | Chou | ............... | G02F 1/1345 |

FOREIGN PATENT DOCUMENTS

| | | | |
|---|---|---|---|
| CN | 103293780 | | 9/2013 |
| CN | 104238854 | | 12/2014 |
| CN | 104238854 A | * 12/2014 | ............. G06F 3/041 |
| CN | 104238854 A | | 12/2014 |
| CN | 204203592 | | 3/2015 |
| CN | 204203592 U | * | 3/2015 |
| CN | 204203592 U | | 3/2015 |
| CN | 104679327 A | | 6/2015 |
| CN | 105045453 A | | 11/2015 |

OTHER PUBLICATIONS

Boe Technology Group Co., Ltd., et al., "First Office Action", CN Application No. 201510512961.5, dated Jul. 17, 2017.

* cited by examiner

IN-CELL TOUCH SCREEN AND A DISPLAY DEVICE

TECHNICAL FIELD

The present application relates to the field of touch display technology, and more particularly to a Full In-Cell (FIC) touch screen and a display device.

BACKGROUND

Touch screen, also known as touch panel, has been widely used in a variety of electronic products and widely accepted by consumers, so in the industry it is committed to improve the touch screen display technology to provide consumers with a better user experience.

A built-in capacitive touch screen has a touch electrode structure integrated in a display screen, with advantages of simple structure, light, thin, low cost, and become a mainstream technology of the touch screen increasingly, and for example is widely used in a variety of portable intelligent terminal (such as a cell phone) increasingly.

Built-in capacitive touch screen can be classified as On-Cell touch screen and In-Cell touch screen, which In-Cell touch screen can be further classified as Hybrid In-Cell (HIC) capacitive touch screen and Full In-Cell (FIC) capacitive touch screen.

In the existing FIC capacitive touch screen, the touch electrode structure is integrated between the array substrate and the color filter CF, and is patterned in a same layer. During patterning of the touch electrodes, the running of gate lines (lines connecting to the gate of the TFT) and data lines in the array substrate are not taken into account. The orthographic projection of the touch electrode for forming the capacitor on the array substrate covers at least a portion of the data lines on the array substrate. Therefore, in operation, the touch electrode is susceptible to the signal interference of gate lines and data lines (especially data lines), and report for false touch point is easily caused.

SUMMARY

It is an object of the present invention to prevent the capacitive signal of the touch electrode in the FIC capacitive touch panel from signal interference from at least the data lines on the array substrate, thereby reducing the report for false touch point.

In order to achieve the above object or other objects, the present invention provides the following technical solutions.

According to an aspect of the present invention, there is provided an In-Cell touch screen comprising an array substrate and touch electrodes disposed above or below the array substrate, the touch electrodes comprising a plurality of first capacitive electrodes and a plurality of second capacitive electrodes, wherein the first capacitive electrodes comprises a plurality of electrically connected capacitive electrode blocks which are correspondingly located at the areas of the array substrate where at least part of the sub-pixel units are located.

In one embodiment, wherein the second capacitive electrode is one or more electrically connected linear capacitive electrodes, each of the linear capacitive electrodes being located between two adjacent rows of the capacitive electrode blocks.

In one embodiment, the linear capacitive electrode and the capacitive electrode block are provided at different layers.

In one embodiment, each of the capacitive electrode blocks has the same shape and size.

In one embodiment, the size of the capacitive electrode block is not larger than the size of the sub-pixel unit, the shape thereof is similar to that of the sub-pixel unit, so that the orthographic projection of each capacitive electrode block on the array substrate falls within the respective sub-pixel unit.

In one embodiment, the array substrate is provided with cross-arranged gate lines and data lines, and a plurality of sub-pixel units arranged in an array and located at a region surrounded by the gate lines and data lines; and the linear capacitive electrode is insulated from the gate line and/or the data line, and the position of the orthographic projection of each of the linear capacitive electrodes on the array substrate overlaps with the position of the gate line or the data line on the array substrate. The insulation can be achieved by providing an insulating layer therebetween.

In one embodiment, a plurality of the linear capacitive electrodes are electrically connected through a first lead, the position of the orthographic projection of the first lead on the array substrate overlaps with the position of a data line or gate line on the array substrate.

In one embodiment, the first capacitive electrode is led out through second leads, and the position of the orthographic projection of the second leads on the array substrate overlaps with the position of data lines on the array substrate.

In one embodiment, a plurality of the second leads are arranged in parallel, each of the second leads being disposed between adjacent rows of capacitive electrode blocks.

In one embodiment, the plurality of electrically connected capacitive electrode blocks are electrically connected by connection lines disposed between two adjacent columns of capacitive electrode blocks.

In one embodiment, the plurality of electrically connected capacitive electrode blocks are arranged in rows and columns, and said connecting lines are arranged between the adjacent columns of capacitive electrode blocks of the plurality of electrically connected capacitive electrode blocks, and are arranged between adjacent rows of capacitive electrode blocks of the plurality of electrically connected capacitive electrode blocks.

In one embodiment, the plurality of electrically connected capacitive electrode blocks are arranged in rows and columns.

The number of the capacitive electrode blocks in the touch electrodes is the same as the number of the sub-pixel units and the capacitive electrode blocks are arranged in an array corresponding to each of the sub-pixel units respectively.

In one embodiment, a sub-pixel unit which is not provided with a capacitive electrode block (310) is provided with a conductive layer having the same size and shape as those of the capacitive electrode block (310).

In one embodiment, a liquid crystal layer, the touch electrodes, and the color filter are sequentially provided over the array substrate. In one embodiment, the touch electrodes are located on a side of the underlying substrate of the array substrate which departs from the gate and data lines on the array substrate. In one embodiment, the touch electrodes are formed on an underlying substrate separated from the array substrate, and the underlying substrate on which the touch electrode is formed is positioned above or below the array substrate.

According to still another aspect of the present invention, there is provided a display device comprising any of the In-Cell touch screens described above.

The technical effect of the present invention is that by arranging the capacitance electrode blocks of the touch electrodes in the areas where the sub-pixels are located, rather than the areas where the gate lines or the data lines are located, the signal interference of the gate line and the data line to the capacitance electrode block is reduced, which can avoid the occurrence of report for false touch point.

BRIEF DESCRIPTION OF THE DRAWINGS

The foregoing and other objects and advantages of the present invention will become more fully apparent from the following detailed description taken in conjunction with the accompanying drawings in which like or similar elements are denoted by like reference numerals.

FIG. 3 is a schematic diagram of a layered structure of touch electrodes of a FIC capacitive touch screen according to an embodiment of the present invention, wherein FIG. 3(a) shows linear capacitive electrodes arranged in rows, and FIG. 3(b) shows mainly capacitive electrode blocks;

FIG. 6 is a schematic view of orthographic projection of the touch electrodes of the embodiment of FIG. 3 on the TFT array substrate, wherein FIG. 6(a) is a schematic view of orthographic projection of the linear capacitive electrode on the TFT array substrate, and FIG. 6(b) is a schematic view of orthographic projection of the capacitive electrode blocks on the TFT array substrate.

DETAILED EMBODIMENTS

Figure 1:
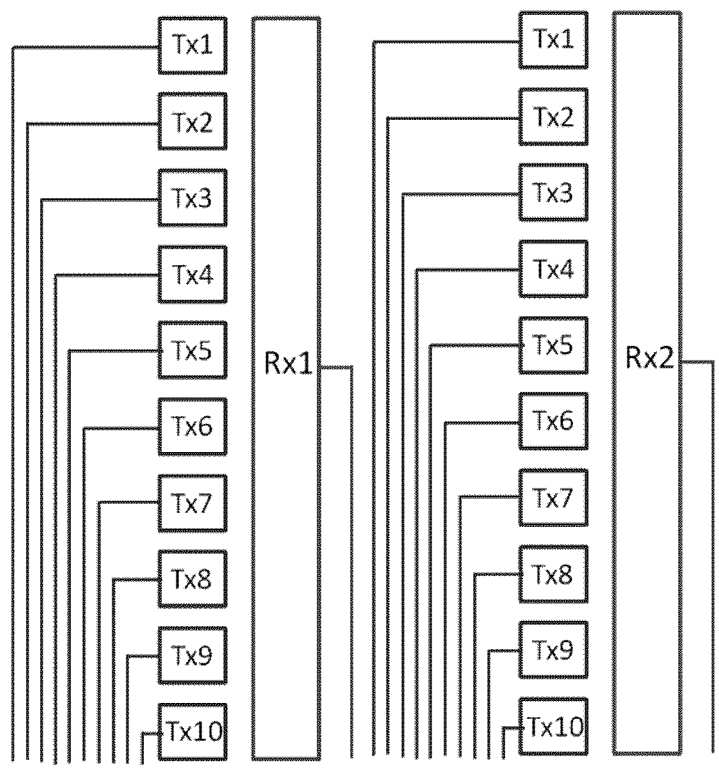
FIG. 1 is a partial schematic diagram of touch electrodes of a FIC capacitive touch screen.

The following is a description of some of multiple possible embodiments of the present invention, which are intended to provide a basic understanding of the present invention and are not intended to identify key or determinative elements of the invention or to define a protection scope. It will be readily appreciated that other embodiments which can replace each other may be suggested by those ordinary skilled in the art without departing from the spirit of the invention in accordance with the technical solution of the present invention. Accordingly, the following detailed description and accompanying drawings are only illustrative of the technical solutions of the present invention and should not be construed as a limitation or definition of the whole present invention or of technical solutions of the present invention.

In the following detailed description, reference is made to the accompanying drawings, which form a part of the detailed description and are shown by way of illustrative and specific embodiments in which the invention may be practiced. In this regard, directional terms such as "top", "bottom", "left", "right", "upper", "lower" and the like are used with reference to the orientation of the illustrated graph. Since the components of the embodiments may be positioned in several different orientations, directional terms are used for illustrative purposes and are not for limitation. It is to be understood that other embodiments may be utilized or logical changes may be made without departing from the scope of the invention. The following detailed description is therefore not to be taken in a limiting sense, and the scope of the invention is defined by the appended claims.

The terms "above or below" used regarding the portion, element or material layer forming or positioning "above or below" a surface may be used herein to indicate that the portion, element, or material layer is positioned (e.g., placed, formed, deposited, etc.) "indirectly" on or under the implied surface, with one or more additional portions, elements or layers disposed between the implied surface and the portion, element or material layer; or to indicate that the portion, material, or material layer is "directly" positioned (e.g., placed, formed, deposited, etc.) on or under the implied surface, for example, in direct contact with it.

In the drawings, the size and shape of the respective films do not reflect the true proportions, and the purpose is merely illustrative of the basic structure and shape of the respective film layers of the FIC capacitive touch screen of the embodiments of the present invention. In the drawings, for convenience of description, only a schematic structural view of a local sub-pixel unit (six rows by six columns) of a FIC capacitive touch screen is given, and those skilled in the art will be able to derive corresponding structure settings for all the pixels of the FIC capacitor touch screen according to the following teachings and hints.

Referring to FIG. 1, a schematic view of partial composition of mutual capacitive touch electrodes of a FIC capacitive touch screen is shown. The layout of the receiving electrodes Tx (Tx1-Tx10) and the receiving electrodes Rx (Rx1, Rx2) does not take the arrangement of the sub-pixel units on the array substrate into account, and not take into account whether the orthographic projection of them on the array substrate covers the gate lines and data lines of the array substrate. Therefore, when the capacitive touch screen is operated (for example, the pixel charging capacitive signal), the capacitive signal of the touch electrode is liable to be interfered by the data line, resulting in a false touch signal, that is, a report for false touch point.

Figure 2:
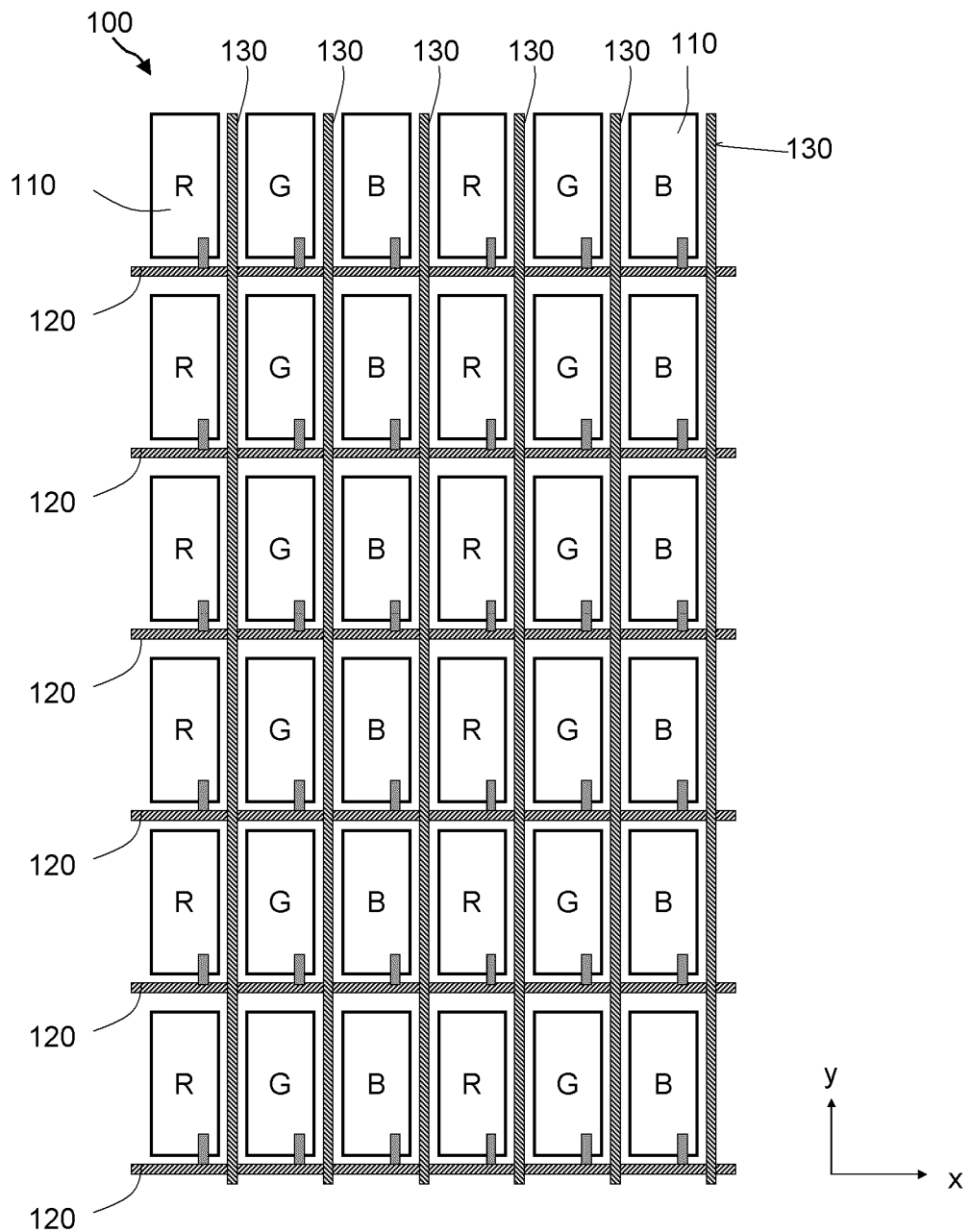
FIG. 2 is a schematic diagram of a basic structure of an array substrate according to an embodiment of the present invention.

FIG. 2 shows a schematic structural view of an array substrate according to an embodiment of the present invention. The FIC capacitive touch screen of the embodiment of the present invention is provided with an array substrate 100 which mainly comprises a plurality of data lines 130 and a plurality of gate lines 120 arranged in cross arrangement, and a plurality of red (R), green (G), blue (B) sub-pixel units 110 arranged in array. Therein, each sub-pixel unit 110 is connected to the data line 130 through a thin film transistor TFT, and the TFT is controlled by the gate line 120. The data lines 130 are disposed between two adjacent columns of the sub-pixel units 110 and the plurality of data lines 130 are arranged substantially parallel; the gate lines 120 are disposed between two adjacent rows of the sub-pixel units 110 and the plurality of gates lines 120 are substantially arranged in parallel. In operation, the data lines 130 and the gate lines 120 require bias signals, so that the corresponding sub-pixel unit 110 is controlled by the bias signal, which thereby controls the respective sub-pixel of the liquid crystal layer disposed oppositely.

It is to be noted that, in the embodiment of the present invention, the direction in which the sub-pixel units 110 are arranged in rows is defined as x-direction, and the direction in which the sub-pixel units 110 are arranged in columns is defined as y-direction. It is to be understood that "rows" and "columns" are relative positional concepts that are interchangeable.

The data line 130, the gate line 120, and the sub-pixel unit 110 of the array substrate 100 may be patterned on a glass substrate, which may be disposed opposite to the liquid crystal layer (not shown).

Figure 3:
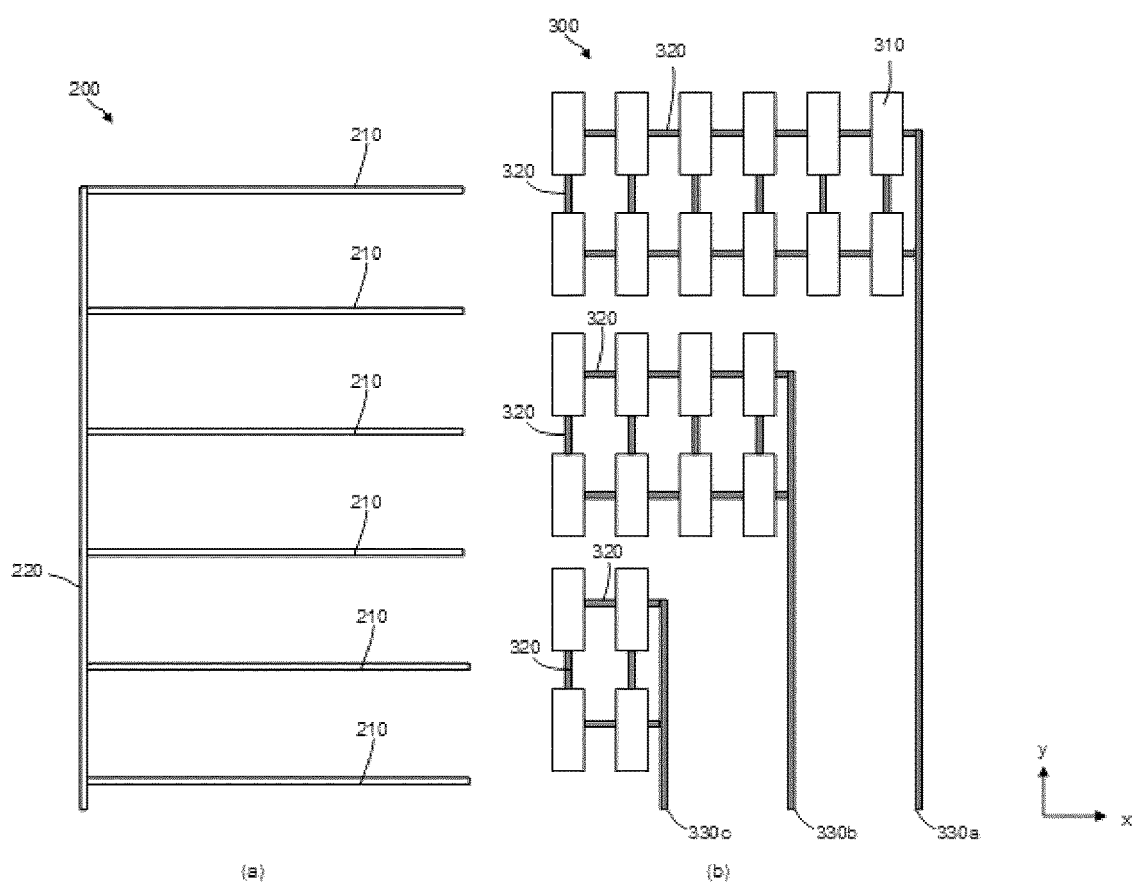
Figure 4:
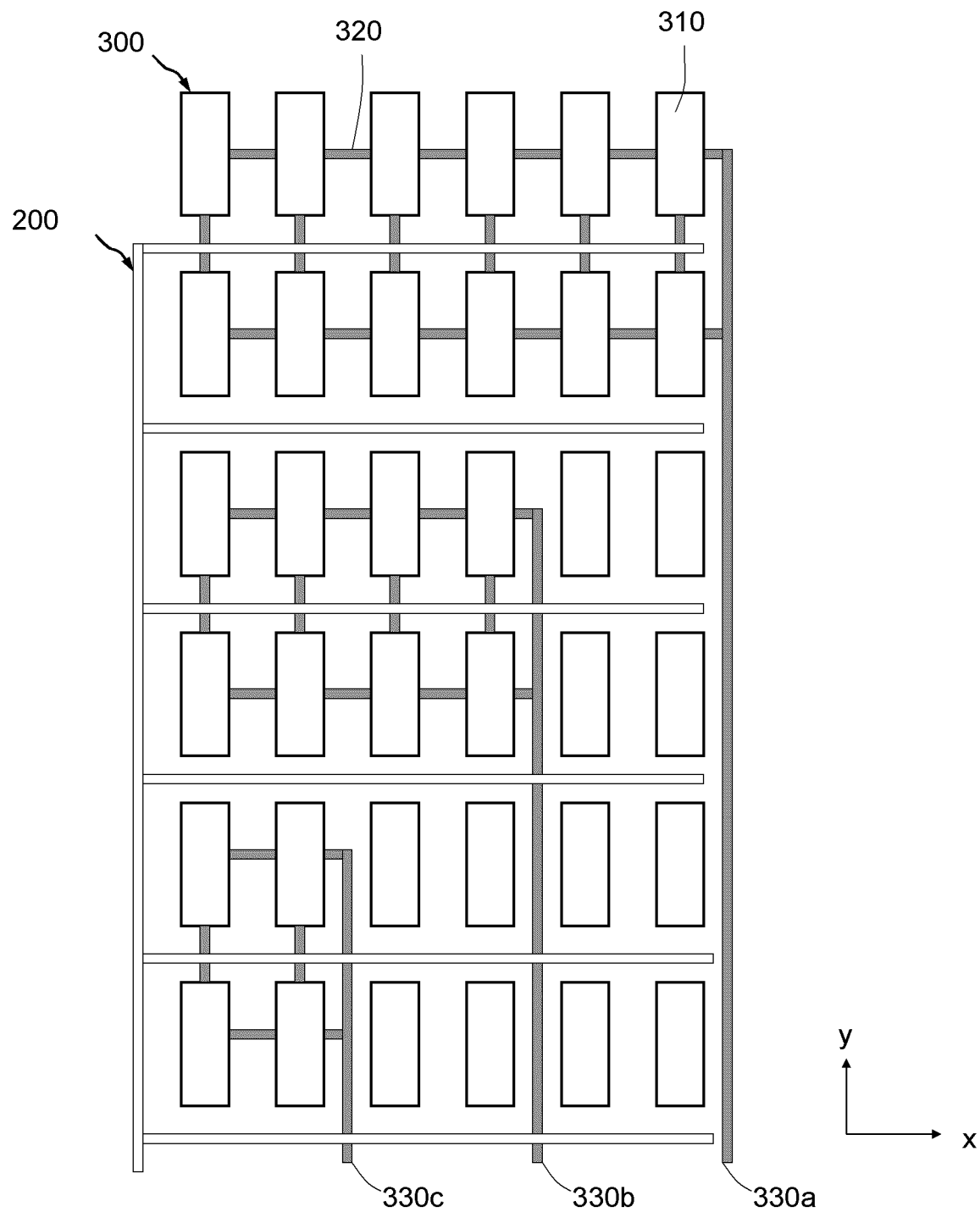
FIG. 4 is a top view of touch electrodes of the FIC capacitive touch screen of the embodiment of FIG. 3.
Figure 5:
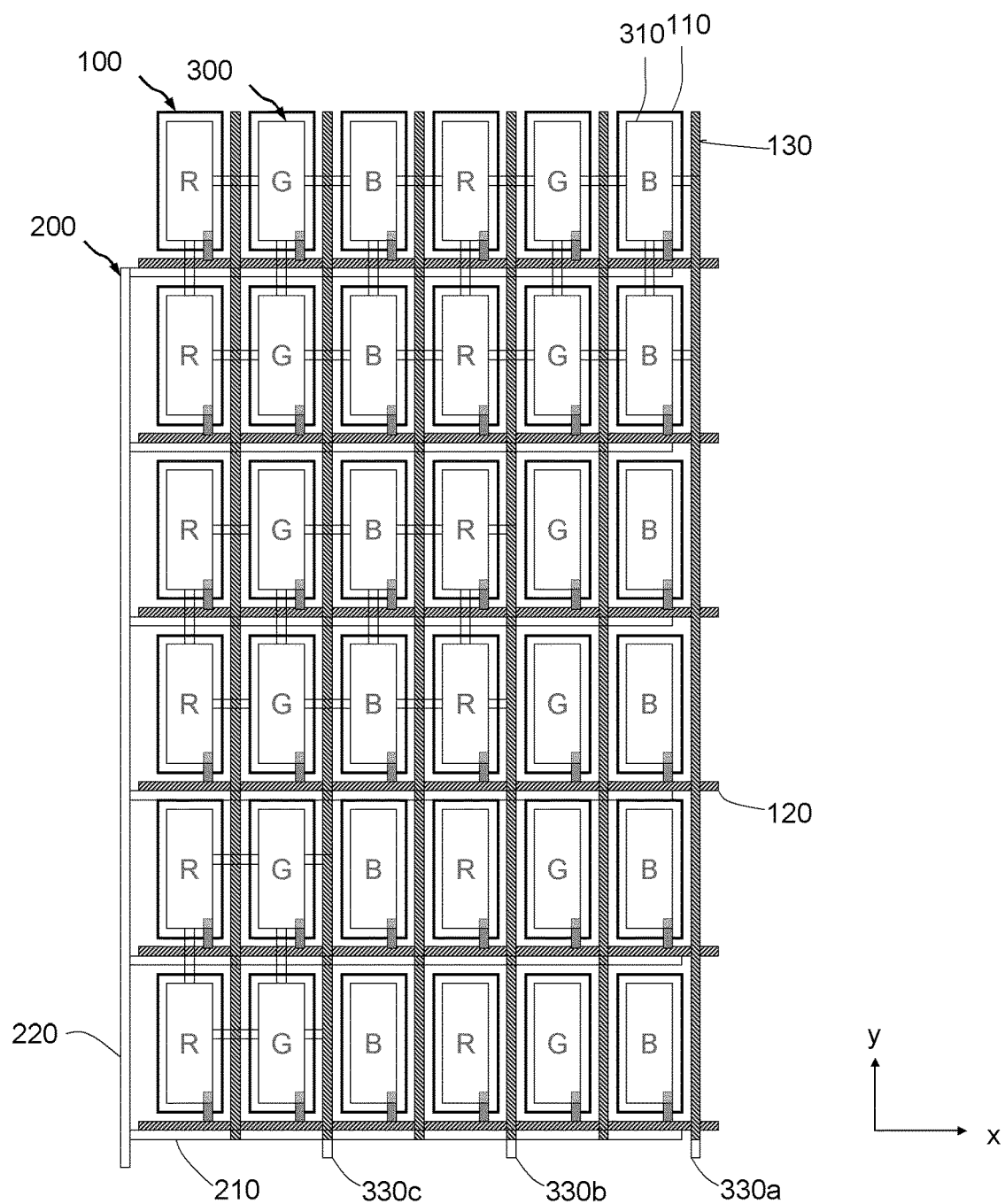
FIG. 5 is a top view of the touch electrodes of the FIC capacitive touch screen of the embodiment of FIG. 3 on the array substrate of the embodiment of FIG. 2.
Figure 6:
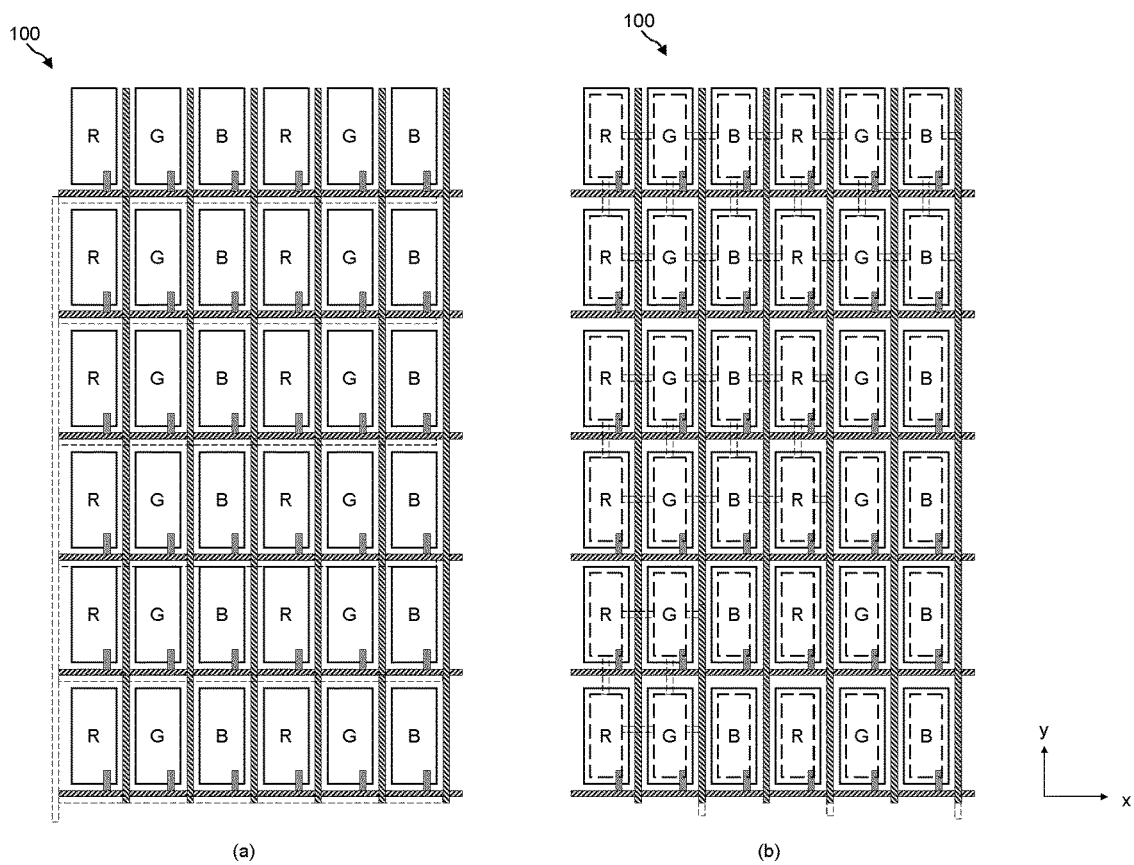

FIG. 3 is a schematic view showing a layered structure of touch electrodes of a FIC capacitive touch panel according to an embodiment of the present invention. Therein, FIG. 3(a) shows linear capacitive electrodes arranged in rows, and FIG. 3(b) shows mainly capacitive electrode blocks. FIG. 4 is a plan view of the touch electrodes of the FIC capacitive touch screen of the embodiment of FIG. 3. FIG. 5 shows a top view of the touch electrodes of the FIC capacitive touch screen of the embodiment of FIG. 3 placed on the array substrate of the embodiment of FIG. 2. FIG. 6 shows a schematic view of orthographic projection of the touch electrodes of the embodiment of FIG. 3 on a TFT array substrate, wherein FIG. 6(a) is a schematic view of orthographic projection of the linear capacitive electrodes on a TFT array substrate, and FIG. 6(b) is a schematic view of orthographic projection of the capacitive electrode blocks on the TFT array substrate.

The FIC capacitive touch screen according to the embodiment of the present invention will be described in detail with reference to FIGS. 1 to 6, and especially the arrangement of the touch electrodes of the FIC capacitive touch screen according to the embodiment of the present invention will be described in detail.

In this embodiment, the touch electrodes of the FIC capacitive touch screen are provided with two layers of wiring, and the first layer of wiring comprises the capacitive electrode blocks 310 as shown in FIG. 3(b) for forming the first capacitive electrodes 300 of the touch capacitances; the second layer of wiring is the linear capacitive electrodes 210 as shown in FIG. 3(a) for forming the second capacitive electrodes 200 of the touch capacitances. With the sub-pixel units of six rows by six columns as an example, 36 capacitive electrode blocks 310 are arranged in correspondence with the arrangement of the sub-pixel units 110 shown in FIG. 2, and the capacitive electrode blocks 310 are arranged corresponding to each sub-pixel unit 110 respectively. For example, when the capacitive electrode blocks 310 are evenly spaced and arranged by six rows by six columns, the orthographic projection of each capacitive electrode block 310 on the array substrate 100 will fall on the corresponding sub-pixel unit 110. Each capacitive electrode block 310 has the same shape and size. In this embodiment the size of the capacitive electrode block 310 is less than or equal to the size of the sub-pixel unit 110 such that the area of the capacitive electrode block 310 is less than or equal to that of the sub-pixel unit 110. Thus the orthographic projection of each capacitive electrode block 310 on the array substrate 100 falls within the corresponding sub-pixel unit 110 without exceeding the range of the sub-pixel unit 110. It will be appreciated that the row spacing and column spacing of the capacitive electrode blocks 310 are respectively affected by the row spacing and column spacing of the sub-pixel units 110 on the array substrate 100 and are also affected by their sizes in the y and x directions, respectively.

It is to be noted that, in the present invention, the orthographic projection refers to projecting perpendicularly to the array substrate. The orthographic projection on the array substrate is indicated by a dashed line accordingly.

In one embodiment of the present invention, several capacitive electrode blocks 310 in a region may be connected together by one or more connection lines 320 to form a first capacitive electrode of a touch unit. As shown in FIG. 3(b), the connection line 320 may be provided between the two capacitive electrode blocks 310 in the x direction or in the y direction. A plurality of capacitive electrode blocks 310 connected together are led out through a lead 330 which can be arranged in the y direction and is located between the two adjacent rows of the capacitive electrode blocks 310. Via the lead 330, the several capacitive electrode blocks 310 can be provided with a bias signal simultaneously.

Another layer of wiring of the touch electrodes of the FIC capacitive touch screen is shown as FIG. 3(a), and comprises the linear capacitive electrodes 210. A plurality of linear capacitive electrodes 210 are arranged in parallel in this embodiment, and the orthographic projection of each linear capacitive electrode 210 on the array substrate 100 is located between two adjacent rows of the sub-pixel units 110 (as shown in FIG. 6(a)). As shown in FIG. 5, each of the linear capacitive electrodes 210 is provided between the two adjacent rows of the capacitive electrode blocks 310 when two layers of wirings of the touch electrodes of the FIC capacitive touch screen overlap together. The plurality of linear capacitance electrodes 210 are led out through a lead 220, and the lead 220 are provided perpendicularly to the linear capacitance electrodes 210. The lead 220 can simultaneously provide the bias signal to the plurality of linear capacitive electrodes 210 connected thereto.

With a mutual capacitive touch electrode as an example, several capacitive electrode blocks 310 in a region are connected together by connecting lines 320 to form a transmitting electrode Tx of a touching unit and are led out through a lead 330. Linear capacitive electrode 210 are disposed between the rows of the several capacitive electrode blocks 310 (shown in FIG. 4), constituting a common receiving electrode Rx of one or more touch units. The Tx transmits signals, and the Rx receives signals, and they form a mutual capacitance, so as to achieve the touch function. In the example shown in FIG. 4, three transmitting electrodes Tx are formed, in which two rows and six columns of capacitive electrode blocks 310 are connected together to constitute a Tx of a certain touch unit, and two rows and four columns of capacitive electrode blocks 310 are connected together to constitute a Tx of another touch unit, and two rows and two columns of capacitive electrode blocks 310 are connected together to constitute a Tx of a further touch unit, and they are respectively led out through different leads 330. It is to be understood that the number of capacitive electrode blocks 310 included in each of the transmitting electrode Tx is not limited, that is the number of the capacitive electrode blocks 310 connected together is not limited, and may be set in accordance with the particular touch accuracy requirements.

With self-capacitive touch electrode as an example, several capacitive electrode blocks 310 of a certain region are connected together by connecting lines 320 to form a capacitive electrode of a touching unit and are led out through a lead 330. Linear capacitive electrodes 210 are disposed between the rows of the several capacitive electrode blocks 310 (as shown in FIG. 4), constituting another capacitive electrode of the touch unit. The linear capacitive electrodes 210 are grounded. It is to be understood that the number of capacitive electrode blocks 310 connected together is not limited and can be set according to the particular touch accuracy requirements.

The first electrode 300 and the second electrode 200 for forming the touch electrodes may be patterned and formed on a same substrate in different layers, and the substrate may be disposed above or below the array substrate 100. In a preferred embodiment, the substrate for forming the touch electrodes is disposed above the array substrate 100 and the first electrode 300 and the second electrode 200 of the touch electrodes are disposed facing the liquid crystal layer, and the liquid crystal layer is positioned between the substrate of the touch electrode and the array substrate 100. The color filter CF is further placed above the touch electrode so that the touch electrodes are formed between the liquid crystal layer and the color filter. Of course, according to common sense in the art, it is necessary to provide a necessary insulating layer between the layers, and a necessary planarization layer is required between the liquid crystal layer and the other layer. Alternatively, the first electrode and the second electrode may be directly made on the underlying substrate of the array substrate and on a side of the substrate opposite to the gate and data lines. FIG. 5 shows a top view of the touch electrode placed on the array substrate of the embodiment of FIG. 2 when the touch electrode is formed by a transparent electrode such as ITO. As shown also in FIG. 6, in this embodiment, each of the capacitive electrode blocks 310 is arranged corresponding to the sub-pixel unit 110, and its projection falls on the sub-pixel unit 110 and does not cover the data line 130 so that the signal interference of the data line 130 to the capacitive electrode block 310 as the touch electrode can be effectively reduced, so that the report for false touch point of the FIC capacitive touch screen can be reduced, which also facilitates improving the yield.

In an embodiment, as shown in FIGS. 5 and 6(b), the leads 330 in the first electrodes 300 are provided corresponding to the data lines 130 on the array substrate 100, that is, the position of the orthographic projection of the leads 330 on the array substrate 100 is substantially overlapping with the position of the data line 130 on the array substrate 100. Thus, it facilitates increasing the aperture ratio of the FIC capacitive touch screen. In other embodiments, the leads 330 may also be staggered with respect to the data lines 130 on the array substrate 100, i.e., the position of the orthographic projection of the leads 330 on the array substrate 100 is substantially offset from the position of the data line 130 on the array substrate 100 (not shown), in order to further reduce the signal interference of the data line 130 to the first electrode 300. As such, a certain aperture rate is sacrificed while signal interference to the touch capacitance is further reduced.

In one embodiment, as shown in FIGS. 5 and 6(a), the linear capacitive electrodes 210 in the second electrode 200 may be staggered with respect to the gate line 120 on the array substrate 100, that is, the position of the orthographic projection of the linear capacitive electrodes 210 on the array substrate 100 is substantially offset from the position of the gate lines 120 on the array substrate 100. Thus it facilitates reducing the signal interference of the gate lines to the linear capacitive electrodes 210 (although it is very small). In other embodiments, the linear capacitive electrodes 210 in the second electrode 200 may also be provided corresponding to the gate lines 120 on the array substrate 100, that is, the position of the orthographic projection of the linear capacitive electrodes 210 on the array substrate 100 substantially is overlapping with the position of the gate line 120 on the array substrate 100 (not shown), so that it facilitates increasing the aperture ratio of the FIC capacitive touch screen.

Likewise, the position of the orthographic projection of the lead 220 of the second electrode 200 on the array substrate 100 is substantially overlapping or staggered with the position of the gate line 120 on the array substrate 100, which may be selected depending on the specific requirements.

In the FIC capacitive touch screen of the above embodiment, the capacitive electrode blocks are staggered with respect to the data lines on the array substrate, and the signal line which is the main source of the signal interference to the capacitance of the touch electrode will greatly reduce the signal interference to the capacitive electrode block. Therefore, the report for false touch point can be avoided, the FIC capacitive touch screen yield can be improved, and the user experience is better. It should be understood that, the above technical effects can be achieved, in spite of the self-capacitive or the mutual capacitive type.

The FIC capacitive touch screen of the above embodiment may be further assembled with a component such as a driving IC to form a display device which can be applied to various types of electronic devices.

The above example mainly describes the FIC capacitive touch screen of the present invention. While only some of the embodiments of the present invention have been described, it will be understood by those ordinary skilled in the art that the invention may be embodied in many other forms without departing from the spirit and scope thereof. Accordingly, the illustrated examples and embodiments are to be considered as illustrative and not restrictive, and that the invention may include various modifications and replacements without departing from the spirit and scope of the invention as defined by the appended claims.

The invention claimed is:

1. An In-Cell touch screen comprising an array substrate (100) and touch electrodes disposed above or below the array substrate (100), the touch electrodes comprising a plurality of first capacitive electrodes and a plurality of second capacitive electrodes, wherein the first capacitive electrodes comprises a plurality of electrically connected capacitive electrode blocks (310), and an orthographic projection of each capacitive electrode block on the array substrate falls within a corresponding sub-pixel unit without exceeding a range of the sub-pixel unit.

2. The In-Cell touch screen according to claim 1, wherein the second capacitive electrode is one or more electrically connected linear capacitive electrodes (210), each of the linear capacitive electrodes (210) being located between two adjacent rows of the capacitive electrode blocks (310).

3. The In-Cell touch screen according to claim 2, wherein the linear capacitive electrode and the capacitive electrode block are provided at different layers.

4. The In-Cell touch screen according to claim 2, wherein the array substrate (100) is provided with cross-arranged gate lines (120) and data lines (130), and a plurality of sub-pixel units (110) arranged in an array and located at a region surrounded by the gate lines (120) and data lines (130); and the linear capacitive electrode (210) is insulated from the gate line and/or the data line, and the position of the orthographic projection of each of the linear capacitive electrodes (210) on the array substrate (100) overlaps with the position of the gate line or the data line (120) on the array substrate (100).

5. The In-Cell touch screen according to claim 4, wherein a plurality of the linear capacitive electrodes (210) are electrically connected through a first lead (220), the position of the orthographic projection of the first lead (220) on the array substrate (100) overlaps with the position of a data line or gate line (130) on the array substrate (100).

6. The In-Cell touch screen according to claim 2, wherein the plurality of electrically connected capacitive electrode blocks (310) are electrically connected by connection lines (320) disposed between two adjacent columns of capacitive electrode blocks (310).

7. The In-Cell touch screen according to claim 2, wherein the number of the capacitive electrode blocks (310) in the touch electrodes is the same as the number of the sub-pixel units (110) and the capacitive electrode blocks are arranged in an array corresponding to each of the sub-pixel units (110) respectively.

8. The In-Cell touch screen according to claim 1, wherein each of the capacitive electrode blocks (310) has the same shape and size.

9. The In-Cell touch screen according to claim 8, wherein the size of the capacitive electrode block (310) is not larger than the size of the sub-pixel unit (110), and the shape of the capacitive electrode block (310) is similar to that of the sub-pixel unit (110), such that the orthographic projection of each capacitive electrode block (310) on the array substrate (100) falls within the respective sub-pixel unit (110).

10. The In-Cell touch screen according to claim 1, wherein the size of the capacitive electrode block (310) is not larger than the size of the sub-pixel unit (110), and the shape of the capacitive electrode block (310) is similar to that of the sub-pixel unit (110), such that the orthographic projection of each capacitive electrode block (310) on the array substrate (100) falls within the respective sub-pixel unit (110).

11. The In-Cell touch screen according to claim 1, wherein the first capacitive electrode is led out through second leads, and the position of the orthographic projection of the second leads (330) on the array substrate (100) overlaps with the position of data lines (130) on the array substrate (100).

12. The In-Cell touch screen according to claim 11, wherein a plurality of the second leads are arranged in parallel, each of the second leads being disposed between adjacent rows of capacitive electrode blocks (310).

13. The In-Cell touch screen according to claim 1, wherein the plurality of electrically connected capacitive electrode blocks (310) are electrically connected by connection lines (320) disposed between two adjacent columns of capacitive electrode blocks (310).

14. The In-Cell touch screen according to claim 13, wherein the plurality of electrically connected capacitive electrode blocks (310) are arranged in rows and columns.

15. The In-Cell touch screen according to claim 1, wherein the number of the capacitive electrode blocks (310) in the touch electrodes is the same as the number of the sub-pixel units (110) and the capacitive electrode blocks are arranged in an array corresponding to each of the sub-pixel units (110) respectively.

16. The In-Cell touch screen according to claim 1, wherein a liquid crystal layer, the touch electrodes, and the color filter are sequentially provided over the array substrate (100).

17. The In-Cell touch screen according to claim 1, wherein a sub-pixel unit which is not provided with a capacitive electrode block (310) is provided with a conductive layer having the same size and shape as those of the capacitive electrode block (310).

18. The In-Cell touch screen according to claim 1, wherein the touch electrodes are located on a side of the underlying substrate of the array substrate which departs from the gate and data lines on the array substrate.

19. The In-Cell touch screen according to claim 1, wherein the touch electrodes are formed on a substrate separated from the array substrate, and the substrate on which the touch electrode is formed is positioned above or below the array substrate.

20. A display device comprising any of the In-Cell touch screens according to claim 1.

* * * * *